(12) United States Patent
Mrazek et al.

(10) Patent No.: US 7,701,459 B1
(45) Date of Patent: Apr. 20, 2010

(54) PRIMITIVE ORIENTED ASSEMBLY FOR PARALLEL VERTEX/GEOMETRY PROCESSING

(75) Inventors: Dane T. Mrazek, Redwood City, CA (US); James C. Bowman, Pescadero, CA (US); Sameer M. Gauria, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 692 days.

(21) Appl. No.: 11/556,525

(22) Filed: Nov. 3, 2006

(51) Int. Cl.
*G06F 15/80* (2006.01)
*G06T 17/00* (2006.01)
*G06F 13/00* (2006.01)

(52) U.S. Cl. .................. 345/505; 345/420; 345/536

(58) Field of Classification Search ......... 345/501–502, 345/506, 522, 505, 420, 536
See application file for complete search history.

(56) References Cited

U.S. PATENT DOCUMENTS

| 6,717,576 | B1 * | 4/2004 | Duluk et al. ................ 345/419 |
| 6,795,080 | B2 * | 9/2004 | Lavelle et al. .............. 345/552 |
| 7,002,586 | B2 * | 2/2006 | Chiu et al. .................. 345/505 |
| 7,071,935 | B1 * | 7/2006 | Deering et al. ............. 345/419 |
| 7,106,336 | B1 * | 9/2006 | Hutchins ..................... 345/530 |

* cited by examiner

*Primary Examiner*—Ryan R Yang
(74) *Attorney, Agent, or Firm*—Cooley Godward Kronish LLP

(57) ABSTRACT

A graphics system has parallel processing units that do not share vertex information. The graphics system constructs independent batches of work for the parallel processing units in which each batch of work has a list of vertices for a set of primitives.

18 Claims, 4 Drawing Sheets

US 7,701,459 B1

PRIMITIVE ORIENTED ASSEMBLY FOR PARALLEL VERTEX/GEOMETRY PROCESSING

FIELD OF THE INVENTION

The present invention is generally related to graphics technology for generating vertex and primitive information in a graphics system. More particularly, the present invention is directed towards generating vertex and primitive information in a graphics system having parallel downstream processing engines.

BACKGROUND OF THE INVENTION

Graphics processing is conventionally performed in a sequence of pipelined stages. There are a variety of different conventional pipeline architectures, depending on implementation details and the level of granularity that certain operations are described. However, conventionally the pipeline stages perform geometry processing and then pixel processing. The geometry processing stages may include, for example, transform and lighting. Additionally, geometry processing may include vertex shading.

Referring to FIGS. 1 and 2, a prior art graphics processing architecture of the Nvidia Corporation of Santa Clara, Calif. included a rotating vertex cache (V-cache) to improve the efficiency of a vertex/geometry processing stage 118 which performed primitive assembly, vertex shading, and other geometry processing operations. As illustrated in FIG. 1, input vertices (VTX IN) were processed by a vertex processing engine 105 and the resulting vertices (VTX out) were buffered in slots (e.g., 32 slots) of a common vertex buffer 110. The common vertex buffer 110 provided vertex information for all of the geometry processing units 115 of geometry processing stage 118. As illustrated in FIG. 2, the common vertex buffer was implemented as a rotating vertex cache (V-cache) 200 included slot assignments (indicated by lines around the perimeter of rotation) for an upstream unit to write vertices into the V-cache.

New vertices were added to slots in V-cache 200 in a serial fashion to fill the rotating V-cache. A rolling history was maintained to support the V-cache. Primitives were then assembled and processed by geometry processing units 115 using entries in the V-cache. A benefit of the rotating V-cache of FIG. 2 is that any triangle being processed by the geometry processing units 115 could reference any slot in the V-cache. The rotating V-cache permitted the re-use of vertices between primitives and therefore improves efficiency. Thus, for example, if the slot assignment was A B C D E F G H; then, primitives could be assembled reusing any of the entries in the V-cache. For example, in this example, primitives (triangles) ABC and DEF could be assembled from entries in the V-cache.

The rotating V-cache architecture is a vertex-oriented architecture designed to facilitate the use (and reuse) of vertices for primitive assembly, vertex shading, and other geometry processing operations. However, one drawback of a rotating V-cache architecture is that it limits scalability. In the rotating V-cache architecture the slot entries of the V-cache 200 are a shared resource for all of the geometry processing units 115 to assemble primitives and perform geometry processing. However, there are practical limits on the size of a single V-cache. Additionally, since the V-cache is designed as a shared resource, it imposes a constraint that units using the V-cache 200 be communicatively coupled in a manner consistent with using a shared resource. However, coordination of different units with a shared V-cache resource creates problems with scalability.

Therefore, in light of the above described problem the apparatus, method, and system of the present invention was developed.

SUMMARY OF THE INVENTION

A graphics system has parallel processing units that do not share vertex information. Independent batches of work are generated for the parallel processing units with each independent batch of work corresponding to a complete list of vertices for a set of primitives.

One embodiment of a method of performing graphics processing using parallel geometry processing engines includes receiving an input stream identifying vertex indices and at least one command for generating primitives. The method includes assembling primitives associated with a list of vertex indices. The method includes constructing independent batches of work for downstream vertex and geometry processing in independent parallel processing units that do not share vertex information. Each independent batch of work corresponds to a complete list of vertices for a set of primitives with the total number of vertices being less than or equal to a maximum pre-selected number of vertices.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
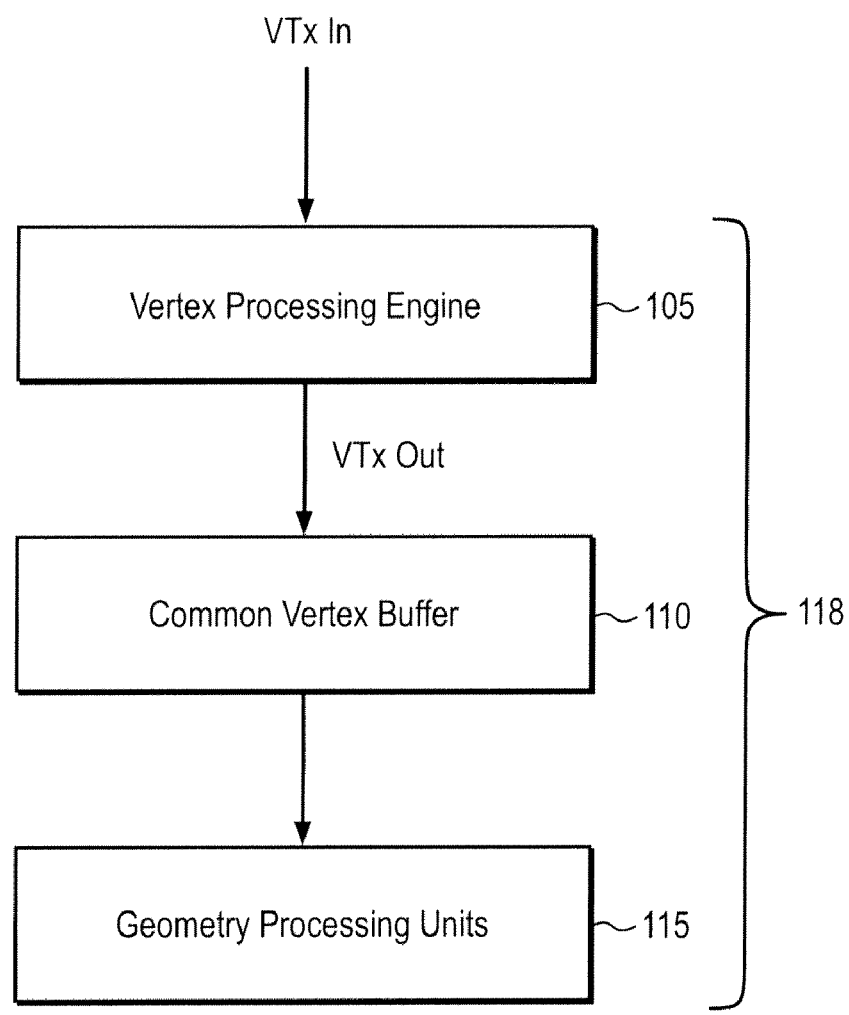
FIG. 1 illustrates a prior art graphics apparatus having a common vertex buffer.
Figure 2:
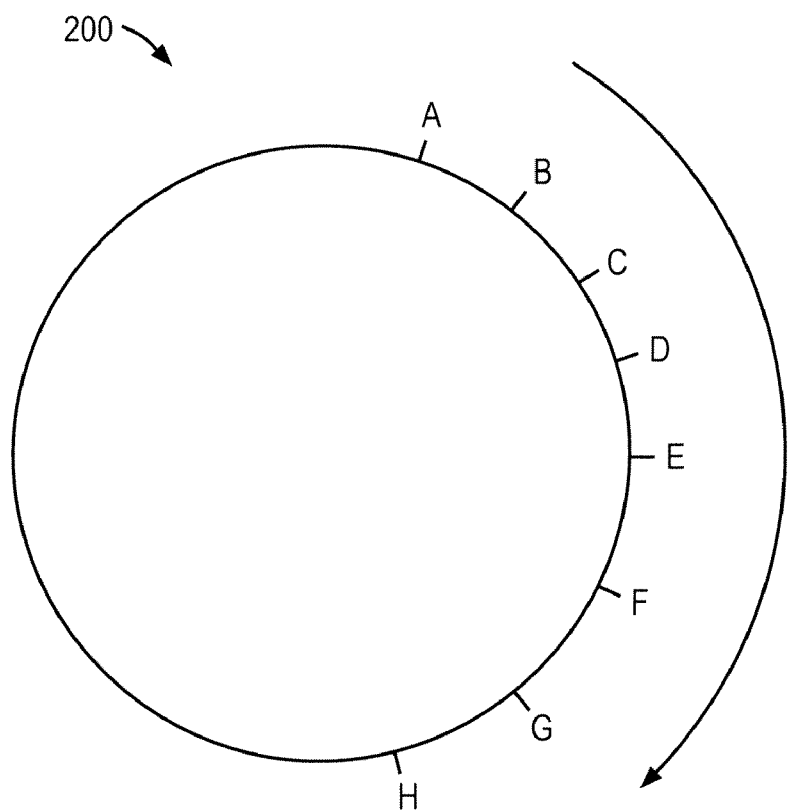
FIG. 2 illustrates a rotating vertex cache in accordance with the prior art.
Figure 3:
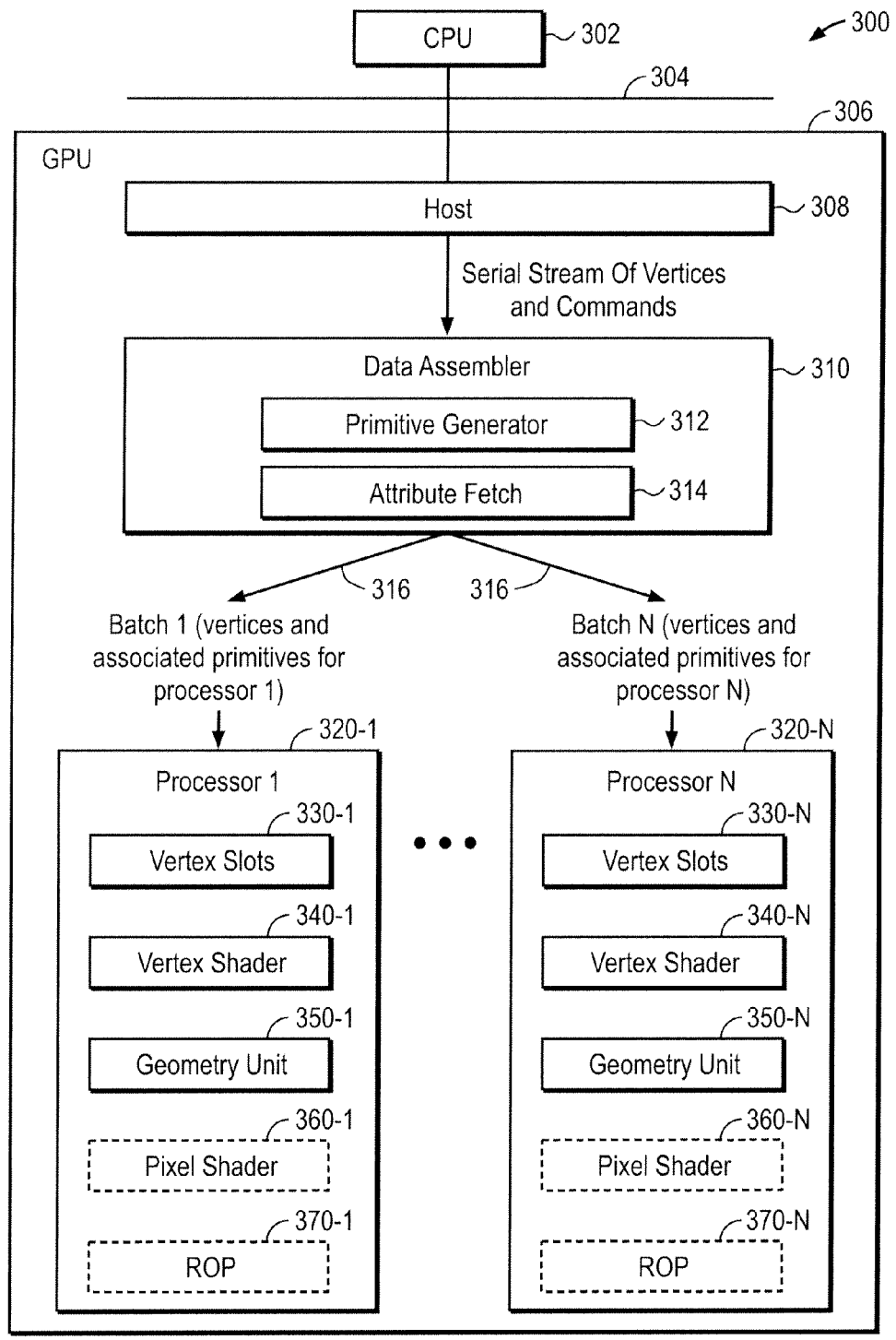
FIG. 3 illustrates a graphics system with generating batches of work for parallel vertex/geometry processing units in accordance with one embodiment of the present invention.

FIG. 3 illustrates a graphics system 300 in accordance with one embodiment of the present invention. A central processing unit (CPU) 302 is coupled to a graphics processing unit (GPU) 306 by an interface 304 such as a high-speed bus or bridge. In a graphics system, CPU 302 generates commands for the GPU 306 to render pixels for displaying graphical images. A host 308 within GPU 306 acts as an interface with CPU 302 and performs, for example, any necessary translations of abstract graphics commands into a format required by graphics hardware. Host 308 may, for example, receive conventional graphics API calls from CPU 302, such as graphics API calls in accordance with conventional graphics languages for pipelined graphics architectures such as the OpenGL® API.

A data assembler unit 310 receives a serial stream of vertices and commands from host 308. As an illustrative example, the serial stream may include a "to do" list for a set of vertices and a command indicating operations to be performed on the vertices, such as a triangle strip command, a point command, a line command, a triangle command, a line strip command, a quad command, or a polygon command. The "to do" commands thus provide instructions for generating primitives from vertices.

Data assembler unit 310 includes a primitive generator unit 312 to perform at least an initial stage of primitive assembly in which primitives are identified based on input vertices and commands. An attribute fetch unit 314 is provided to fetch information for identified vertices. For example, attribute fetch unit 314 may access vertex attributes from a vertex cache or other resource. As described below in more detail, data assembler unit 310 writes batches 316 of work based on an initial identification of primitives belonging to a set of vertices.

GPU 306 is implemented with a highly scalable architecture for performing vertex processing and geometry processing operations required to generate a representation of primitive in screen space, rasterize primitives, and perform other steps required to render pixels for display. In one embodiment, GPU 306 has a pipelined architecture with a plurality of parallel vertex/geometry processors 320-1 to 320-N to perform vertex and geometry processing operations, where N is a whole number at least equal to two. In one implementation, N=8 although more generally N may be any number at least equal to two. Each vertex/geometry processor 320 performs at least vertex processing and geometry processing. Each vertex/geometry processor 320 includes a vertex buffer 330 with slots buffering a set of vertices, a vertex shader 340 for performing vertex processing, and a geometry unit 350 for performing geometry processing. In one embodiment there are 32 slots per vertex buffer 330 of each vertex/geometry processor 320 although more generally there may be an arbitrary number depending on the implementation. Vertex shader 340 may further have parallel threads, such as for example 8 threads.

Additional conventional stages (not shown) are included for graphics processing, such as a pixel shading stage and a raster operations stage. These additional stages may also optionally be implemented as parallel units.

Each parallel vertex/geometry processor 320 operates independently of the other vertex/geometry processors 320 and does not share vertex information from its vertex buffer 330. Thus, for example, vertex/geometry processor 320-1 utilizes vertices in slots of its vertex buffer 330-1 to perform vertex and geometry processing operation on a set of triangles. However, in this example, vertex/geometry processor 320-1 has no knowledge of the vertices in the vertex buffer 330-N of vertex/geometry processor 320-N. This partitioning of functionality facilitates a highly scalable architecture. However, one consequence of the lack of vertex sharing between parallel vertex/geometry processors is that work should be efficiently allocated to each individual vertex/geometry processor 320 as independent units of work.

As illustrated in FIG. 3, data assembler unit 310 converts a serial stream of vertices and commands into batches 316 of work assigned to an available vertex/geometry processor 320. Each batch includes a list of primitives assigned to the batch along with a set of vertices for the primitives. That is, data assembler performs at least an initial stage of primitive assembly in terms of identifying primitives (e.g., triangles) and a corresponding set of vertices such that vertex information can be sent in batches. To perform this task, data assembler 310 preferably incorporates several rules. One rule is that a batch has a pre-selected maximum number of vertices. For example, the maximum number of vertices per match may be determined by the size of each vertex buffer 330. Another rule is that primitives can't span batches. In other words, a batch includes an identification of all of the vertices necessary for the set of primitives associated with the batch. Other optional rules may also be included, such as a rule defining a limit on the number of primitives per batch. A result of the rules is that an available vertex/geometry processor 320 that receives a set of vertices assigned to its vertex buffer 330 can perform vertex/geometry processing without having to communicate with other vertex/geometry processing units for vertex data.

Figure 4:
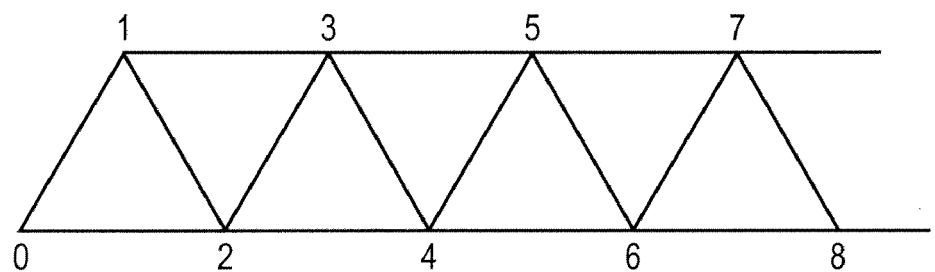
FIG. 4 illustrates a triangle strip in accordance with an illustrative application of the present invention.

FIG. 4 illustrates the concept of batching where vertex data can not commute across batches. Referring to FIG. 4, as an illustrative example, suppose that a batch size corresponds to four vertices and that a triangle strip is being processed having a set of ascending order vertex indices (e.g., indices 0, 1, 2, 3, 4, 5, 6, 7, and 8 for a strip). In this illustrative example, an initial batch, batch 0 has vertices 0, 1, 2, and 3. A corresponding set of triangles is $\Delta_{012}$ and $\Delta_{123}$ where $\Delta$ indicates a triangle and the subscript indicates triangle vertices. A second batch, batch 1, has vertices 2, 3, 4, and 5. The corresponding set of triangle for the second batch is $\Delta_{234}$ and $\Delta_{345}$. A third batch has vertices 4, 5, 6, 7 and primitives $\Delta_{456}$ and $\Delta_{567}$.

In one embodiment data assembler 310 implements the batch rules to make flush/no flush decisions as primitives are collected by primitive generator 312. For example, the primitive assembly may be performed sequentially based on the input commands, i.e., from a set of input vertices one primitive is identified, then another, and another, and so on. For each primitive that is identified, a lookup operation is performed of the vertices of the primitive and then a batch decision is made consistent with the batch rules. For example, at some initial starting time, a new batch is started. As each additional primitive is collected, a decision is made for the additional primitive whether adding it to the batch is consistent with the batch rules, such as a limit on a total number of vertices per batch and primitives not spanning different batches. When additional primitives can no longer be added to a batch, the batch is flushed (i.e., the old batch is written to an available vertex/geometry processor 320 and a new batch begun). In one implementation, all of the lookups for a primitive (e.g., three lookups for the case the primitive is a triangle) are performed in a single clock cycle.

As another illustrative example, consider an example in which the primitives are triangles and there is a triangle list. In this example, assume a batch size of 8 vertices with vertex indices 0, 1, 2, 3, 4, 5, 6, and 7 and a triangle list for drawing triangles having vertex indices 0 1, 2, 3, 4, 5, 6, 7, 0. As one example, the initial list of indices may correspond to vertices A, B, C, D, E, F, G, and H. Suppose, as a first example that a new batch is started. A first primitive with vertices ABC (i.e., one vertex is "A", another is vertex "B", and the last is vertex "C") is added to the new batch. Vertices ABC are thus already cached. As a second primitive arrives with vertices GHA it can be added to the batch by writing vertices G and H, i.e., with a batch size of eight, caching eight vertices A, B, C, D, E, F, G, and H as a batch provides the necessary information for processing primitives ABC and GHA. Consider now that a batch has previously had entries for vertices A, B, C, D, E, and F added to the batch. Since there are six entries and a batch size of eight, only two new vertices may be written for the batch. Suppose then that the next primitive identified by the data assembler is primitive GHZ. In this example, there is insufficient room in the batch to add GHZ. As a result, the old batch is flushed and then a new batch is started beginning with vertices GHZ.

One way to understand the benefits of the present invention is that an initial stage of primitive stage is performed before slot assignment of vertex information for vertex/geometry processing. That is, the present invention is primitive-oriented in order to generate an efficient slot assignment of vertex information in different vertex/geometry processing units. The primitive-oriented approach results in batches that are as full as they can possibly be without reordering the original input stream. In contrast, if a conventional vertex-oriented scheme was used in which vertex slots were assigned prior to primitive assembly batch assignment would have to be designed with a large margin to account for the worst case number of missed for a primitive, resulting in large inefficiencies.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method of performing graphics processing using parallel geometry processing engines, comprising:
   receiving a serial input stream identifying vertex indices and at least one command for generating primitives;
   performing an initial stage of primitive assembly before slot assignment of vertex information and utilizing the initial stage of primitive assembly to construct independent batches of work for downstream vertex and geometry processing in independent parallel processing units that each include respective buffer memories that do not share vertex information, each independent batch of work corresponding to a complete list of vertices for a set of primitives with the total number of vertices being less than or equal to a maximum pre-selected number of vertices; and
   writing said independent batches of work to said independent processing units, wherein each batch is written into slots of a buffer of an available independent processing unit for at least one of vertex shading and geometry processing.

2. The method of claim 1, wherein said geometry processing includes vertex shading.

3. The method of claim 1, wherein batches are sequentially filled with vertices of new primitives on a primitive-by-primitive basis, the method further comprising flushing a current batch in response to determining that the current batch in process lacks sufficient space to completely include vertices of an additional primitive.

4. The method of claim 1, wherein primitives are assembled prior to slot assignment in each buffer.

5. The method of claim 1, wherein each batch has a maximum number of primitives.

6. The method of claim 1, wherein primitives are sequentially assembled and for each newly assembled primitive a lookup is performed of the vertices of the primitive and a flush/no flush decision is made.

7. The method of claim 1, further comprising performing vertex shading in independent vertex shaders using said independent batches.

8. A graphics processing unit, comprising:
   a data assembler unit comprising a primitive assembler configured to receive a serial input stream including vertex indices and at least one command for generating primitives and in response perform an initial stage of primitive assembly before slot assignment of vertex information for constructing independent batches of work for downstream vertex and geometry processing units that do not share vertex information, each independent batch of work corresponding to a complete list of vertices for a set of primitives with the total number of vertices being less than or equal to a maximum pre-selected number of vertices.

9. The graphics processing unit of claim 8, further comprising a plurality of independent parallel vertex and geometry processing units each having separate vertex buffers with each batch assigned to an available vertex and geometry processing unit.

10. The graphics processing unit of claim 8, wherein each vertex and geometry processing unit comprises a vertex shader and geometry unit.

11. The graphics processing unit of claim 8, wherein batches are sequentially filled with vertices of new primitives on a primitive-by-primitive basis and a current batch is flushed in response to determining that the current batch in process lacks sufficient space to completely include an additional primitive.

12. The graphics processing unit of claim 8, wherein each batch has a maximum number of primitives.

13. The graphics processing unit of claim 8, wherein primitives are sequentially assembled and for each newly assembled primitive a lookup is performed of the vertices of the primitive and a flush/no flush decision is made within one clock cycle.

14. A graphics processing unit, comprising:
   a data assembler unit comprising a primitive assembler configured to receive a serial input stream identifying vertex indices and at least one command for generating primitives and in response perform an initial stage of primitive assembly before slot assignment of vertex information for constructing independent batches of work, each independent batch of work corresponding to a complete list of vertices for a set of primitives with the total number of vertices being less than or equal to a maximum pre-selected number of vertices; and
   a plurality of parallel processing units for performing vertex and geometry processing, each parallel processing unit having a separate vertex cache buffer such that each parallel processing unit does not share vertex information with other parallel processing units;
   said data assembler unit assigning each batch flushed from said data assembler unit to an available parallel processing unit.

15. The graphics processing unit of claim 14, wherein batches are sequentially filled with vertices of new primitives on a primitive-by-primitive basis and a current batch is flushed in response to determining that the current batch in process lacks sufficient space to completely include an additional primitive.

16. The graphics processing unit of claim 14, wherein each batch has a maximum number of primitives.

17. The graphics processing unit of claim 14, wherein primitives are sequentially assembled and for each newly assembled primitive a lookup is performed of the vertices of the primitive and a flush/no flush decision is made within one clock cycle.

18. The graphics processing unit of claim 14, wherein each parallel processing unit includes a vertex shader and a geometry unit.

* * * * *